United States Patent [19]
Haben et al.

[11] Patent Number: 5,725,434
[45] Date of Patent: Mar. 10, 1998

[54] SHAFT OF FIBRE-REINFORCED MATERIAL

[75] Inventors: Werner Haben; Arno Rudolf Erich Karl Pabsch, both of Brunswick, Germany

[73] Assignee: Deutsche Forschungsanstalt fur Luft-un Raumfahrt e. V., Cologne, Germany

[21] Appl. No.: 562,220

[22] Filed: Nov. 28, 1995

[30] Foreign Application Priority Data

Nov. 28, 1994 [DE] Germany ............... 44 42 268.7
Nov. 22, 1995 [FR] France ..................... 9513847
Nov. 27, 1995 [DE] Germany ............... 195 44 008

[51] Int. Cl.[6] ........................................ F16C 3/02
[52] U.S. Cl. ............................... 464/181; 464/183
[58] Field of Search ........................ 464/181, 182, 464/183, 903, 147, 149; 403/335, 336, 337; 285/405; 138/109, 130

[56] References Cited

U.S. PATENT DOCUMENTS

| | | | |
|---|---|---|---|
| 1,219,138 | 3/1917 | Murray | 285/405 X |
| 2,962,307 | 11/1960 | Nebinger | 285/405 X |
| 3,651,661 | 3/1972 | Darrow | 464/181 |
| 4,173,128 | 11/1979 | Corvelli | 64/1 |
| 4,335,587 | 6/1982 | Thomamueller et al. | 464/181 X |
| 4,551,116 | 11/1985 | Krude | 464/181 X |
| 4,747,806 | 5/1988 | Krude et al. | 464/181 X |
| 4,865,365 | 9/1989 | Meinig | 285/405 X |
| 5,135,596 | 8/1992 | Pabsch et al. | 156/156 |
| 5,358,013 | 10/1994 | McClain | 285/405 X |

FOREIGN PATENT DOCUMENTS

| | | |
|---|---|---|
| 0 087 543 B1 | 9/1983 | European Pat. Off. . |
| 0 142 217 B1 | 4/1988 | European Pat. Off. . |
| 0 280 204 A2 | 8/1988 | European Pat. Off. . |
| 0 280 204 B1 | 8/1988 | European Pat. Off. . |
| 0 443 470 A2 | 8/1991 | European Pat. Off. . |
| 2 564 538 | 5/1984 | France . |
| 2 653 505 | 10/1989 | France . |
| 615105 | 6/1935 | Germany ............... 285/405 |
| 81 29 867 U1 | 6/1983 | Germany . |
| 81 29 867.6 | 6/1983 | Germany . |
| 33 41 077 A1 | 5/1985 | Germany . |
| 35 17 681 A1 | 11/1986 | Germany . |
| 37 18 410 A1 | 12/1987 | Germany . |
| 38 22 417 A1 | 1/1989 | Germany . |
| 39 36 999 A1 | 5/1990 | Germany . |
| 40-5039888 | 2/1993 | Japan ............... 285/405 |
| 40-5280677 | 10/1993 | Japan ............... 285/405 |
| 1418 | 6/1858 | United Kingdom ............... 285/405 |

OTHER PUBLICATIONS

English language Abstract of Japenese Patent 3–22351 Feb. 1991.

*Primary Examiner*—Daniel P. Stodola
*Assistant Examiner*—Eileen A. Dunn
*Attorney, Agent, or Firm*—Salter & Michaelson

[57] ABSTRACT

A shaft with integrated angle compensating elements of fibre-reinforced material includes an elastically-deformable coupling flange which is curved backwards to form an annular portion which connects the flange to the inner wall of a surrounding disk-shaped connection element. The shaft comprises fibres cross-wound at an angle to the axis of the shaft which extend up to the free edge of the flange.

10 Claims, 4 Drawing Sheets

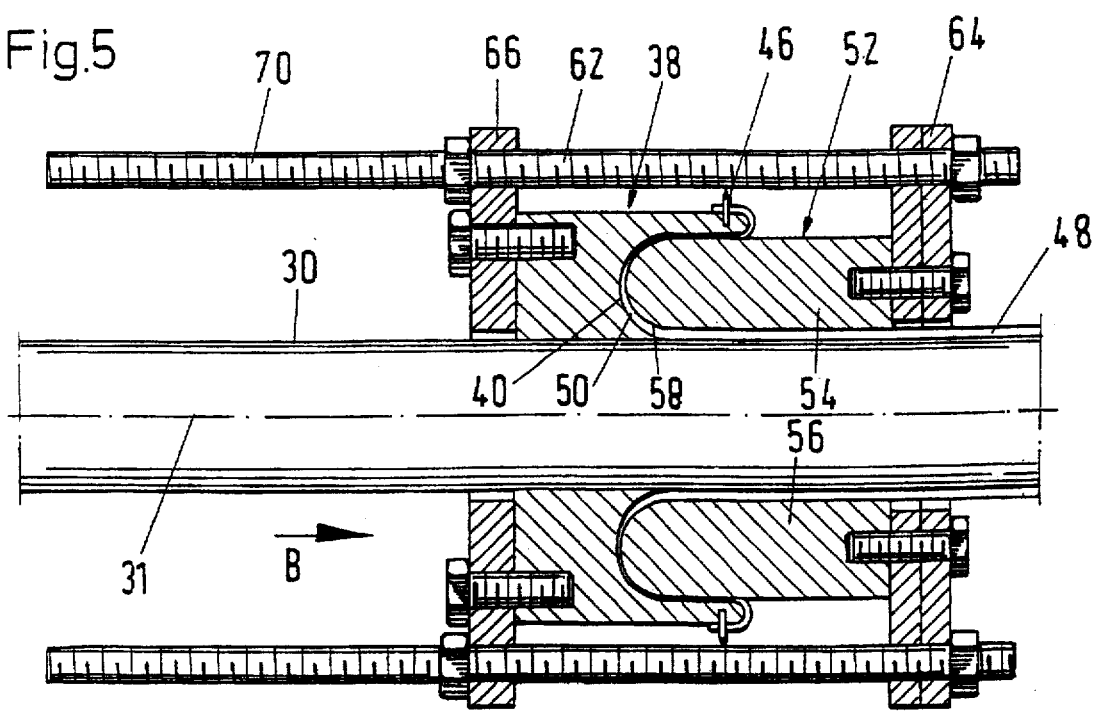
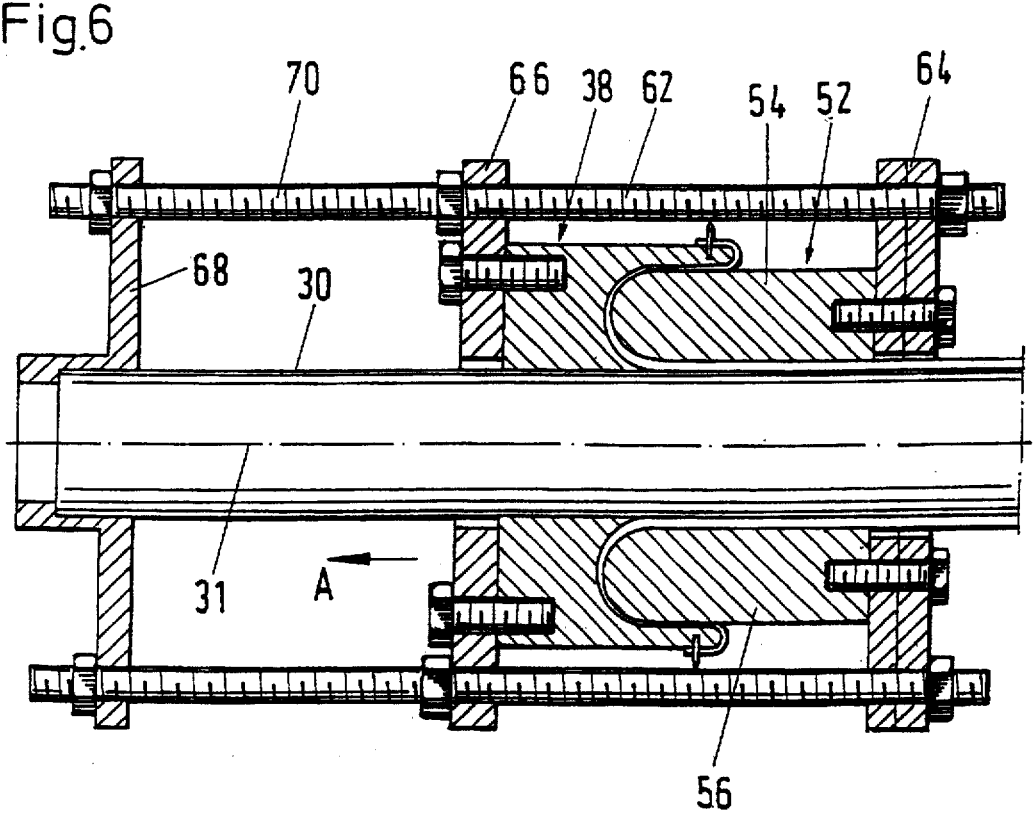

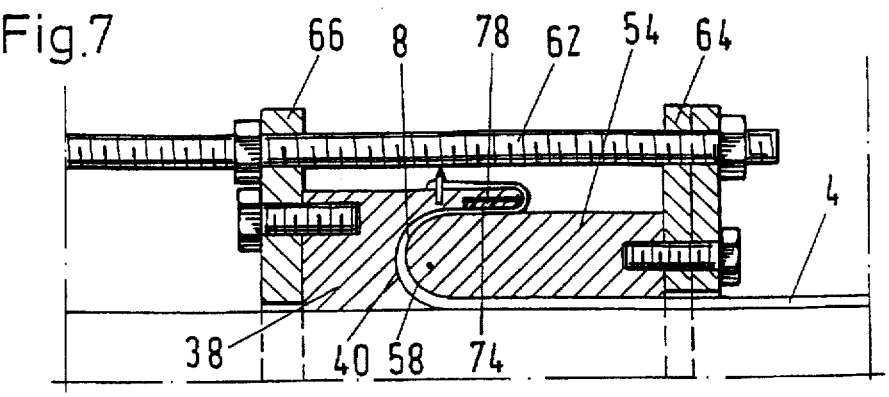
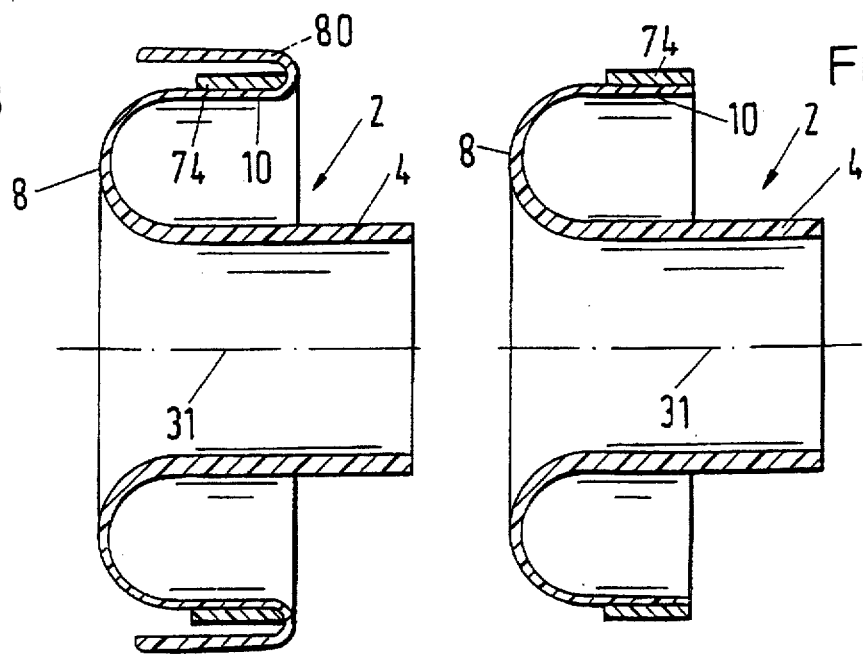
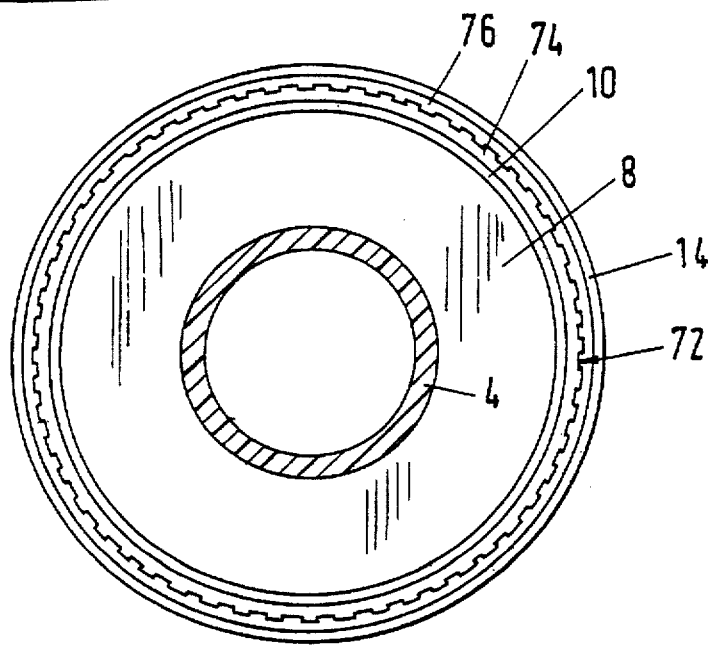

SHAFT OF FIBRE-REINFORCED MATERIAL

BACKGROUND OF THE INVENTION

The invention relates to a shaft made of fibre-reinforced material and in particular a shaft of fibre-reinforced synthetic resin having at least one flange acting as an angle-compensating element.

A shaft having at least one flange, together with a device and a method of manufacturing said shaft, is disclosed in U.S. Pat. No. 5,135,596. In this known shaft, a radial flange or spreader disk is provided which, in the region of its outer periphery, is provided with connection holes. Since in any cross section of the tubular portion and the flange the overall cross section of all of the fibres is identical, this entails a thinning out of the fibre content towards the outer periphery of the flange. Said thinning out has the desired effect that the flange thickness may as a result be continuously reduced over the radius without involving any reduction in the transmissible shearing stresses. This leads in the outer flange region, which is important for the angle-compensating effect of the shaft, to less deformation work and hence to a reduced build-up of heat. Furthermore, the torque characteristic decreases in an outward direction and consequently results in a uniform stress over the flange surface. The outside diameter of the flange is a function of the maximum allowable bending stresses. This results in flange diameters which, in cases where a metal cardan shaft with cardan joints is to be substituted, lead to dimensions which are no longer able to be accommodated in the available design spaces.

From U.S. Pat. No. 4,173,128 a tubular shaft with integrated compensating elements is known, which is made of fibre-reinforced synthetic resin and at the ends of which are disposed metal blind flanges, which engage with a tubular projection into the ends of the shaft. A metal ring is disposed externally on the ends of the shaft, and the connection in the flanges to the shaft is effected by radial rivets, which engage through the outer ring, the shaft and the tubular projection of the flange. The compensating elements take the form of pairs of radially outwardly curved, annular bellows having a cross section in the shape of a graduated circle. The fibre reinforcement comprises +45° fibres and unidirectional fibres, which extend in a longitudinal direction of the shaft. The bellows-like compensating elements do admittedly achieve a localized reduction of the flexural strength which is desired for the angle exchange. The shaft however also obtains as a whole a low flexural strength and is therefore sensitive to vibrations.

From Japanese Patent Document JP-3-223 516 A—Patent Abstracts of Japan—Sect. M Vol. 15 (1991) No.509 (M-1195), a cylindrical shaft made of fibre-reinforced synthetic resin is known, which at its ends is connected by elastic annular webs to the cylinder-ring-shaped wall of a metal connecting flange which, with radial clearance, overlaps the ends of the shaft.

SUMMARY OF THE INVENTION

The present invention seeks to improve a shaft of the type described above in such a way that, for a predetermined angular misalignment or offset combined with a predetermined transmission of energy, the shaft can be constructed with a smaller diameter.

Accordingly, the present invention provides a shaft having integrated angle-compensating elements, said elements being made of synthetic resins reinforced by wound fibres, and having a cylindrical tubular portion with opposed ends, and having, at least at one of said ends, an elastically deformable coupling flange with a free edge, wherein said fibres are cross-wound at an angle to said axis of the shaft and extend beyond the length of said cylindrical tubular portion up to said free edge of the coupling flange, said flange takes the form of a 180° flared flange having a substantially constant inner radius ($R_1$), said flared flange at its free edge overlaps said cylindrical tubular portion, said flange has a cylinder-ring-shaped portion, said flange is connected by said cylinder-ring-shaped portion to a cylindrical inner wall of a dish-shaped connection element, and said inner wall of said connection element overlaps the outside of said cylinder-ring-shaped portion of the flared flange.

In one preferred embodiment, connection members are provided as connecting means between the connection element and the cylinder-ring-shaped portion of the flange, the connecting members passing through the flange. A supporting ring may be provided, which lies against the inside of the cylinder-ring-shaped portion of the flange and into which the connecting members engage.

The disc-shaped connection element may be vulcanized by means of an intermediate elastomer layer to the cylinder-ring-shaped portion of the flange. The intermediate elastomer layer may be designed so as to be elastically deformable in a peripheral direction.

A multiple-spline connection is provided at the outside of the cylindrical portion of the flange and at the inside of the cylinder-ring-shaped wall of the connection element. The shaft and the connection element may be designed so as to be axially displaceable towards one another by means of the multiple-spline connection.

The profile of the multiple-spline connection of the flange of the shaft may be formed on a thin-walled bush, which is connected to the outside of the cylindrical portion of the flange.

The profile of the multiple-spline connection of the inner wall Of the connection element may be formed in a thin-walled bush, which is firmly connected to the inner wall. The bush may be made of an extremely rigid, hard, vibration-resistant plastics material.

The profile of the multiple-spline connection may be formed in the cylindrical inner wall of the connection element. The multiple-spline connection may be constructed with a spline profile having parallel flanks. Alternatively, the multiple-spline connection may be constructed with an involute spline profile. In another embodiment, the multiple-spline profile takes the form of a serration profile.

BRIEF DESCRIPTION OF THE DRAWINGS

Preferred embodiments of the present invention will now be described by way of example only with reference to the accompanying drawings.

FIG. 5 shows manufacture of the flared flange;

FIG. 6 shows a further process step for stretching of the fibres;

FIG. 7 shows a half section illustrating a modified construction of the spreader body in a position corresponding to FIG. 5;

FIG. 8 shows a blank of a flange manufactured using a spreader body according to FIG. 7;

FIG. 9 shows the completed flange; and

FIG. 10 shows an end view of a shaft with connection element viewed from the shaft side.

DESCRIPTION OF THE PREFERRED EMBODIMENTS

Figure 1:
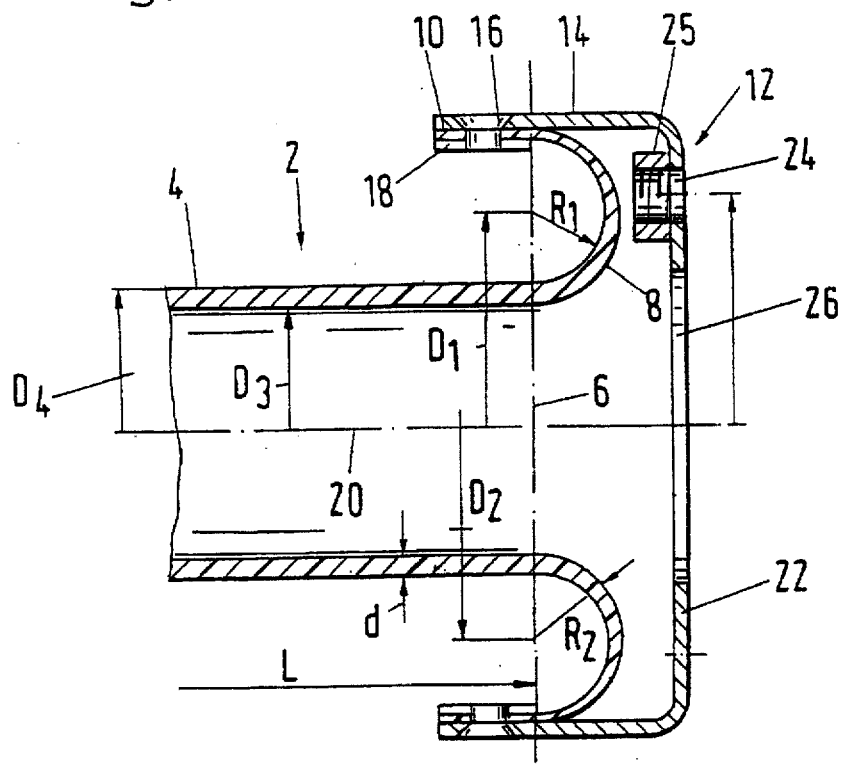
FIG. 1 shows the cross section of an end of a shaft with a flange taking the form of an angle-compensating element.

Referring to the drawings, the shaft 2, of which the end part is illustrated in FIG. 1, comprises a preferably cylindrical, tubular portion 4 which extends up to the dash-dot line 6 and has a length L, an inside diameter $D_3$, an outside diameter $D_4$ and a wall thickness d. Adjoining the tubular portion 4 is the flange part 8, which preferably takes the form of a flared flange with a deflection of the fibres through 180° and with an inner radius $R_1$. The free end of the flared flange forms a cylinder-ring-shaped or tubular portion 10, which extends over the end of the tubular portion 4 of the shaft 2. The flared flange thus formed is connected to a dish- or pot-shaped connection element 12, which with an internally cylindrical, preferably tubular wall 14 overlaps the outside of the tubular flange portion 10 of the flange and, in the embodiment illustrated in FIG. 1, is connected by radially disposed, keyed connecting elements 16—here, shown as rivets—to the flange portion Preferably, there is disposed at the inside an annular supporting body 18, which lies against the inside of the cylinder-ring-shaped portion 10 of the coupling flange and into which the radially disposed connecting elements 16 engage.

Depending on the demands to be placed upon it, the finished shaft may be provided with a flange at one end or at both ends.

In the base 22 of the connection element 12 lying at right angles to the axis 20, holes 24 for receiving connecting elements are provided. Nuts 25 for connecting screws may possibly be fastened here to the inside, in the manner shown at the top of FIG. 1. The shaft may be connected by the connection element 12 to a flange of the drive or output shaft. The connection element is provided with a central through opening 26, which may be designed to receive a centering pin of the connecting flange.

Instead of a rigid, keyed connection between the flange portion 10 and the wall of the connection element, a connection which is resilient in a peripheral direction may be provided by means of an elastic ring attached by vulcanization. The connection element may alternatively be attached in the overlap region by adhesion or vulcanization to the flange portion 10. A further construction of a keyed connection is described below with reference to FIGS. 7 to 10.

The shaft is made of a fibre composite. For transmitting the torsional forces, the fibres are cross-wound at an angle to the axis 20 of the shaft, preferably at an angle of ±45°. To increase the flexural strength, unidirectional fibres may additionally be provided (paraxially) in the region of the cylindrical portion.

The overall cross section of all of the fibres of the cross-winding is identical in the region of the tubular portion 4, in the region of the flared flange 8 and in the region of the cylindrical end portion 10. In the region of the flared flange, the fibre layers are thinned out in accordance with the increasing diameter of the flare. Said thinning out is linked with a corresponding reduction in the wall thickness, such as is described in detail in U.S. Pat. No. 5,135,596 with reference to FIGS. 18 and 19. The inner radius $R_1$ of the flange therefore originates from a diameter $D_1$, which is greater by the difference in the wall thickness of the flared flange at the inside and the outside diameter than the diameter $D_2$, from which the outer radius $R_2$ of the flared flange originates.

Figure 2:
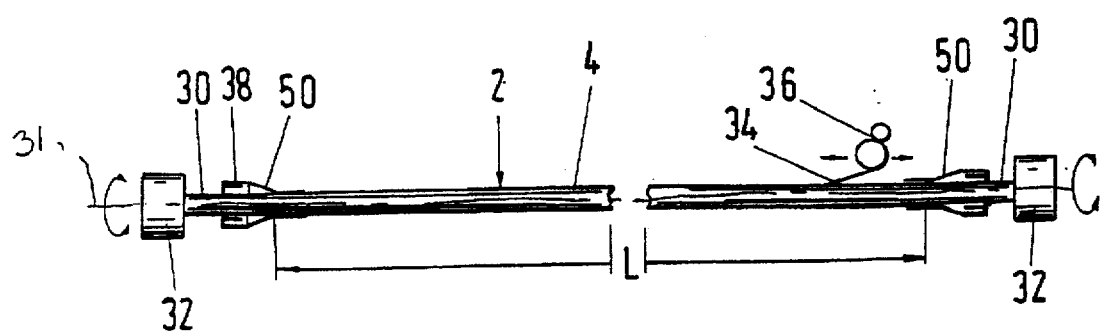
FIG. 2 shows a diagrammatic view of the manufacture of a shaft, on which two flanges are to be formed.

FIG. 2 diagrammatically illustrates a first stage of manufacture of a shaft 2 having flared flanges formed at both ends. The device used for manufacture comprises a cylindrical mandrel 30 with its axis 31, the outside diameter of the mandrel corresponding to the inside diameter $D_3$ of the tubular portion U of the shaft. The mandrel is clamped at both ends into rotatable clamping chucks 32 of a winding machine (not shown), which is drivable in a program-controlled manner in accordance with the desired winding pattern. The fibres 34 are deposited by means of the axially displaceable fibre supply device 36.

A respective spreader body 38 is disposed on the mandrel in the region of each end of the shaft to be wound. The spreader bodies are guided on the mandrel and displaceable in an axial direction of the mandrel 30.

Figure 3:
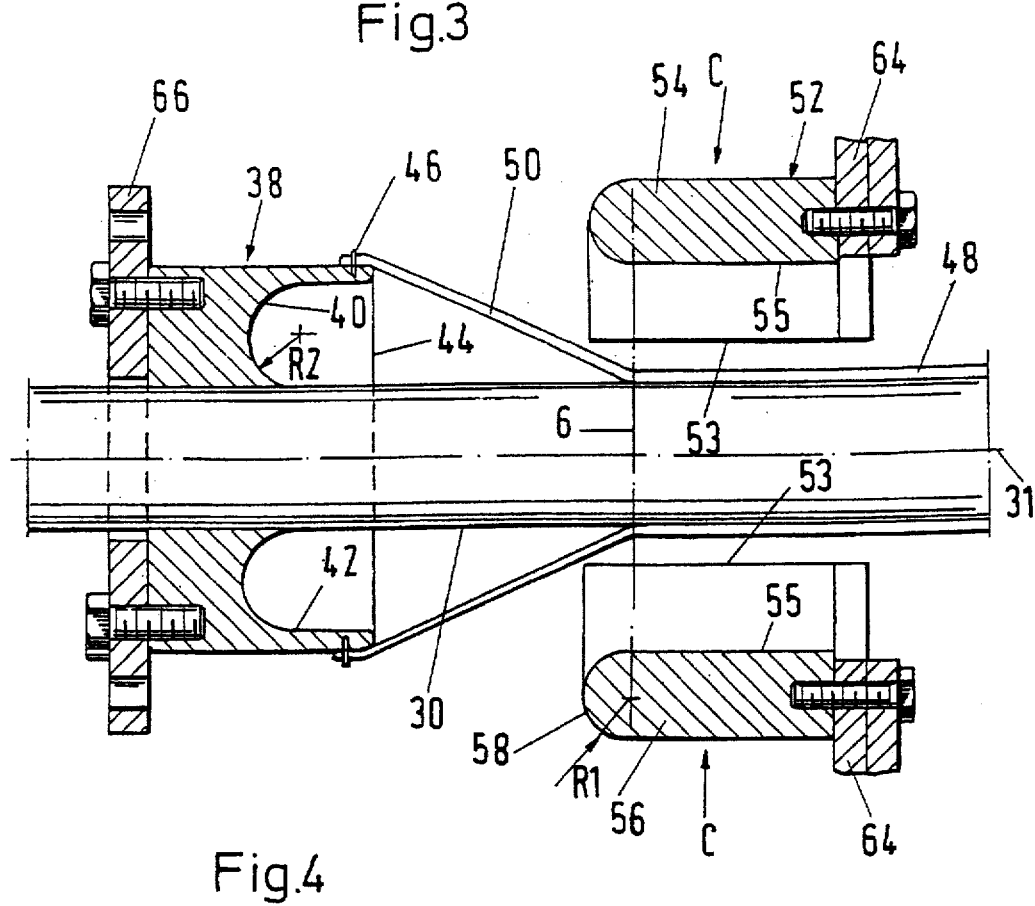
FIG. 3 shows an enlarged view of a spreader body as a forming element of a device for manufacturing shafts with flanges taking the form of angle-compensating elements.

As FIG. 3 reveals, the spreader bodies 38 are provided, in their ends facing one another, with an annular profile recess. The base of the profile recess is rounded in a concave manner to produce a cross section in the shape of a semi-circle having the radius $R_2$ and verges towards the end face 44 of the spreader body into a hollow cylindrical portion 42. The profile, which comprises the outer periphery of the mandrel, the profile recess 40 and the adjoining cylindrical portion 42, defines the outer surface of the flared flange.

Provided at the outside of the spreader body at a distance from the rounded end face 44 are radially outwardly projecting winding spindles 46, by means of which the fibres are deflected during winding. The transition of the winding from the cylindrical portion 48 to the conical portion 50 is preferably effected in the manner described in U.S. Pat. No. 5,135,596—with reference to FIGS. 18 and 19 of said specification.

The fibres used are preferably high-strength fibres, such as carbon fibres, which are wound preferably impregnated with the synthetic resin.

Further elements of the device are forming bodies 52 which, after the winding is complete, are placed onto the ends of the tubular portion 48 of the winding. The forming bodies 52 are split in a plane 53 passing through the axis 31 of the mandrel 30. They may be placed radially onto the finished winding, in the manner indicated by the arrows C in FIG. 3, and in their end position the cylindrical inner wall 55 of their two parts 54, 56 fully encloses the winding up to the line 6 of FIG. 1. At their end facing the spreader body 38, the forming bodies 52 are provided with an annular shoulder 58. The shoulder 58 is rounded in a convex manner to produce a cross section in the shape of a semi-circle having the inner radius $R_1$ and verges at the outside of the forming body 52 into a cylindrical portion 60. The shape of the shoulder 58 corresponds to the concave internal contour of the flared flange 8. The shoulder 58 of the forming body therefore extends beyond the end of the cylindrical winding portion 48 by a length which corresponds to the radius $R_1$.

There follows a description of the device with reference to one of the two pairings of spreader body 38 and forming body 52.

Figure 4:
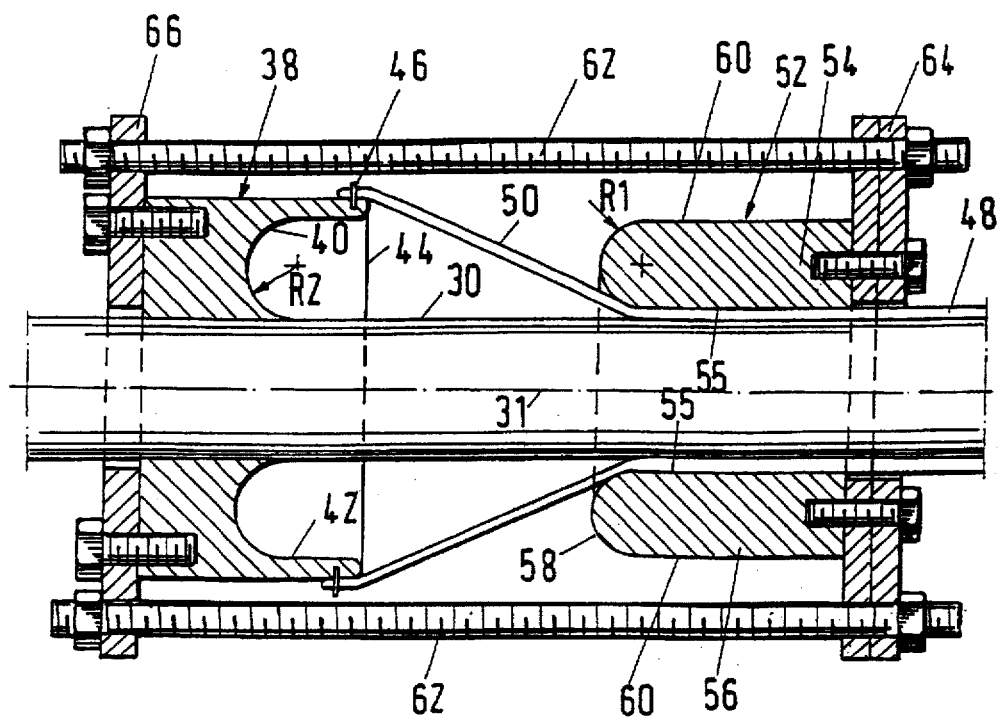
FIG. 4 shows a cross-sectional view of the spreader body according to FIG. 3 and of a forming body mounted on the tubular part of the shaft.

To manufacture the winding, the spreader bodies 38 are mounted on the mandrel at a distance corresponding to the length of the shaft and are arrested in each case in an axial direction on the mandrel. On completion of the winding, the forming bodies 52 split in their axial plane 53 are placed onto the mandrel in such a way that they enclose the ends of the tubular portion 4 of the winding and lie with the rounded shoulder in each case over the adjoining portion of the conical winding portion. In said position shown in FIG. 4, the forming bodies are arrested relative to one another and axially relative to the mandrel. The spreader bodies 38 are then released so that they are axially displaceable on the mandrel 18. Driving means for the spreader bodies 38—here, diagrammatically illustrated by tie bolts 62 and strain washers or clamping flanges 64, 66—are provided, by means of which the spreader bodies 38 may be displaced in the direction of the arrow B—FIG. 5—axially towards the forming bodies 50. In the course of displacement, the conical portion of the winding is drawn around the shoulder 58 of the forming body and applied under initial tension against said shoulder. In the process, the winding pattern of the fibres is maintained in a substantially reproducible manner.

In the end position shown in FIG. 5, the end portion of the shaft 2 with the flared flange is formed between the shaping portions of the mandrel 30, the spreader body 38 and the forming body 52. By virtue of the applied initial tension, the wound structure in the region of the flared flange is compressed and the synthetic resin content is adjusted.

To produce an axial tension of the winding over its entire length which is combined with a stretching of the fibres also in the tubular portion 4 of the shaft, further driving means are provided, by means of which the two firmly connected units of the spreader disk 38 and the forming body 52 may be moved apart from one another. In FIG. 6, tension bolts 70 are provided as driving means, which may take the form of extensions of the tie bolts 62 and here cooperate with a clamping flange 68 arrested on the mandrel. As a result of the axial displacement in the direction of the arrow A in FIG. 6, a tensile force is exerted upon the fibres, with the result that the fibres are stretched. At the same time, as a result of the reaction force upon the forming bodies 52, which have been rendered displaceable in an axial direction for stretching purposes, the stretching force applied onto the region of the flare of the winding may be increased. The tensile force need be applied only at one end of the shaft. The forming body at the opposite end of the mandrel 30 is then required to remain arrested in an axial direction.

Upon attainment of the final tension, the synthetic resin is advantageously cured by rotating the shaft and subjecting it to the influence of heat. After curing, the blank of the shaft thus produced is removed from the mandrel. The free edge of the tubular portion is machined and the shaft is preassembled with the connection element. To manufacture shafts which are to be provided with a flange at one end only, the tubular portion of the shaft is cut to a suitable length.

The driving and arresting means for the forming elements may take a different form for execution of the described functions, particularly also with a view to extensive automation of the individual manufacturing stages.

FIG. 10 illustrates a modified embodiment of a connection between the flange and the connection element. Here, disposed between the tubular portion 10 of the flared flange 8 and the inside of the wall 14 of the connection element 12 overlapping said portion is a multiple-spline connection 72, which may be designed with a spline profile having parallel flanks but also with an involute spline profile. The multiple-spline profile may alternatively take the form of a serration profile.

The profile of the multiple-spline connection of the flange of the shaft, i.e. the shaft profile, is preferably formed on a thin-walled bush 74 which is connected to the outside of the cylinder-ring-shaped portion 10 of the flared flange.

The profile of the multiple-spline connection at the cylindrical inside of the connection element may likewise be formed in a thin-walled bush 76 which is firmly connected to the inner wall of the connection element 12. The profile may however alternatively be worked, e.g. rolled, into the cylindrical inner wall of the connection element.

Where bushes having a multi-spline profile disposed on the inside or the outside are used, said bushes should be as thin as possible in order to keep the outside diameter of the connection element—which is necessarily enlarged by the multi-spline connection—as small as possible. What is advantageous here is a large number of relatively low keys or serrations of a low height.

A serration offers the advantage that in each case radial forces are exerted upon the flange or the inside of the connection element which reduce the load on the cemented joint.

As a material for the bushes 74, 76, extremely stiff, hard, vibration-resistant plastics materials are used, e.g. fluorinated polymers or trioxan-based acetal copolymers. Preferential use is made of plastics materials which enable the bushes with the splining or serration disposed on the outside or the inside to be manufactured by injection moulding.

One possibility of connecting a bush having an external multiple-spline connection to the flange is illustrated in FIG. 7.

Provided at the cylindrical inside of the annular wall of the spreader disk and adjacent to its end 44 is an annular recess 78. The shaft bush 74 of the multiple-spline connection is inserted into said recess prior to application of the winding. When the forming body 52 and the spreader body 38 are moved together, the conical portion 50 of the winding is applied against the inside of the bush 74. Upon curing, the bush may be firmly bonded to the flange by the resin or possibly by using an adhesive applied to the inside of the bush 76. The flange is shown in FIG. 8 in the form in which, after curing, it is removed from the winding device. The portion 78 bent backwards is cut off at the free end of the bush 74. The flange 8 thus produced, with the bush 74 fixed thereon, is shown in FIG. 9.

In the construction according to FIG. 10, the connection element 12 is axially displaceable relative to the flange 8 of the shaft by means of the multiple-spline connection. To prevent accidental removal of the connection element, the multiple-spline connection may be provided with individual locking cams on the one element and with recesses for receiving said cams in the other element.

It will be understood that the above description of the present invention is susceptible to various modifications, changes and adaptations.

What is claimed is:

1. A shaft disposed along a longitudinal axis said shaft comprising:
   a cylindrical tubular portion having opposed ends, said tubular portion being fabricated from elements made of synthetic resins reinforced by wound fibers; and
   an elastically deformable coupling flange formed at one of said ends of the tubular portion, said coupling flange also being fabricated from elements made of synthetic resins reinforced by wound fibers, said coupling flange having a curved portion terminating in a free edge, said wound fibers being cross-wound at an angle to the axis of the shaft and extending beyond the length of the tubular portion to the free edge of the coupling flange in a position in which the free edge of the coupling flange overlaps the tubular portion, said flange being curved approximately 180° degrees and having a substantially constant inner radius, a cylinder-ring-shaped portion disposed adjacent the free edge of the curved portion, and a dish-shaped connection element having a cylindrical inner wall connected to the cylinder-ring-shaped portion, said cylindrical inner wall of the connection element overlapping the outside of said cylinder-ring-shaped portion of the coupling flange.

2. A shaft according to claim 1, wherein connection members are provided as connecting means between said connection element and said cylinder-ring-shaped portion of the flange, said connecting members passing through the flange.

3. A shaft according to claim 1, wherein said connection element is vulcanized by means of an intermediate elastomer layer no said cylinder-ring-shaped portion of the flange.

4. A shaft according to claim 3, wherein said intermediate elastomer layer is designed so as to be elastically deformable in a peripheral direction.

5. A shaft according to claim 1, wherein a multiple-spline connection is provided at the outside of said cylindrical portion of the flange and at the inside of said cylinder-ring-shaped portion of the connection element.

6. A shaft according to claim 5, wherein the profile of said multiple-spline connection of the flange of the shaft is formed on a thin-walled bush, said bush being connected to the outside of said cylindrical portion of the flange.

7. A shaft according to claim 5, wherein the profile of said multiple-spline connection of the inner wall of the connection element is formed in a thin-walled bush, said bush being firmly connected to the inner wall.

8. A shaft according to claim 7, wherein said bush is made of an extremely rigid, hard, vibration-resistant plastics material.

9. A shaft according to claim 5, wherein the multiple-spline connection is constructed with a spline profile having parallel flanks.

10. A shaft according to claim 5, wherein the multiple-spline profile takes the form of a serration profile.

* * * * *